United States Patent [19]

Takahiro et al.

[11] Patent Number: 5,143,889
[45] Date of Patent: Sep. 1, 1992

[54] ACTIVE CARBON AND PROCESSES FOR PREPARATION OF SAME

[75] Inventors: Kasuh Takahiro, Kobe; Morino Gunji, Izumi, both of Japan

[73] Assignee: Osaka Gas Company Limited, Osaka, Japan

[21] Appl. No.: 631,258

[22] Filed: Dec. 20, 1990

Related U.S. Application Data

[63] Continuation-in-part of Ser. No. 391,515, Jul. 19, 1989, abandoned.

[30] Foreign Application Priority Data

Nov. 20, 1987 [JP] Japan .................. 62-294831
Jun. 27, 1988 [JP] Japan .................. 63-158510

[51] Int. Cl.$^5$ .................. C01B 31/12; B01J 20/20
[52] U.S. Cl. .................. 502/427; 502/416; 502/425; 502/437
[58] Field of Search .................. 502/423-425, 502/427, 430-433, 436, 437, 416, 417; 423/445, 449

[56] References Cited

U.S. PATENT DOCUMENTS

| | | | |
|---|---|---|---|
| 3,818,874 | 6/1974 | Wennerberg et al. | 502/427 |
| 4,261,709 | 4/1981 | Itoga et al. | 502/416 |
| 4,488,957 | 12/1984 | Noguchi et al. | 208/40 |
| 4,640,822 | 2/1987 | Noguchi et al. | 208/40 |

FOREIGN PATENT DOCUMENTS

| | | | |
|---|---|---|---|
| 231328 | 12/1985 | German Democratic Rep. | 502/416 |
| 161316 | 8/1985 | Japan | 423/449 |
| 255604 | 12/1985 | Japan | 423/449 |
| 205611 | 9/1986 | Japan | 502/416 |
| 283808 | 12/1987 | Japan | 502/416 |
| 1298938 | 12/1972 | United Kingdom | 423/449 |

Primary Examiner—Paul E. Konopka
Attorney, Agent, or Firm—Larson and Taylor

[57] ABSTRACT

This invention provides a process for preparing active carbon, characterized by activating meso-carbon microbeads derived from coal-type pitch and the active carbon prepared by the process.

3 Claims, 3 Drawing Sheets

ACTIVE CARBON AND PROCESSES FOR PREPARATION OF SAME

This application is a continuation-in-part application of Serial No. 391,515 filed Jul. 19, 1989, now abandoned.

The present invention relates to processes for preparing active carbon from meso-carbon microbeads derived from coal and the obtained active carbon.

The term "activated meso-carbon microbeads" used in this specification is intended to include activated meso-carbon microbeads granulated with a suitable binder as well as the activated meso-carbon microbeads per se.

Active carbon has been used long for removal of impurities and recovery of useful substances from liquids and gases because of its high adsorptivity. Stated more specifically, active carbon is used for treatment of tap water (deodorization and decoloration), decoloration of foods, removal or recovery of organic solvents or recovery of precious metals from solutions of precious metal salts, or as carriers for catalysts, antidotes, molecular sieves for separation of air, materials for batteries or the like.

Conventionally active carbon has been prepared from organic wastes such as resin wastes, residues from pulp production, coal, coal coke, wood, coconut shells or the like. For activation, selective oxidation has been performed in the presence of water vapor, air, oxygen or like oxidizer to form pores. Alternatively activation is effected by combining the hydrogen and oxygen contained in a cellulosic substance in the presence of zinc chloride to form water such that the carbon skeleton is retained. The active carbon prepared in this way maintains the original structure of starting material, and therefore includes the mesopores of 20 to 200 Å in pore diameter and macropores of 200 Å or more in pore diameter as well as the micropores of 20 Å or less in pore diameter which participate directly in the adsorption. Such active carbon requires much time in adsorption because due to the presence of micropores in mesopores or macropores, a substance to be adsorbed is required to pass the mesopores or macropores from outside the active carbon to diffuse over the micropores. These methods result in preparation with a low activation efficiency. Even in case of a yield of about 20 to about 30% based on the starting material, the carbon is activated only to a maximum specific surface area of about 1500 m$^2$/g.

When filled in an adsorbing device, the active carbon derived from crushed coal or coke serving as the starting material is packed too closely because of its crush-type shape, disadvantageously involving a great pressure loss in the device.

Recently fibrous active carbon was developed and found extended applications owing to its peculiar properties and shape. However, fibrous active carbon which is prepared from cellulose, polyacrylonitrile, phenolic resin, pitch or like materials is obtained in a pronouncedly low yield by the activation process, therefore at high costs with limited applications.

Means for Solving the Problems

In view of the aforesaid state of the art, we conducted extensive research on the preparation of carbon materials from new materials, and found that when mesocarbon microbeads are used as the starting material, the problems of conventional techniques can be substantially overcome or markedly alleviated.

According to the present invention, there are provided active carbon and process for preparing the same as listed below:

(1) a process for preparing active carbon, characterized by activating meso-carbon microbeads obtained from coal-type pitch;

(2) a process for preparing active carbon as described in item (1) in which an activating auxiliary is deposited on the surface of meso-carbon microbeads before activation;

(3) a process for preparing active carbon as described in item (2) in which the activating auxiliary is at least one of hydroxides of alkali metals;

(4) a process for preparing active carbon as described in item (2) in which a surfactant is used in depositing the activating auxiliary;

(5) a process for preparing active carbon as described in item (1) in which the activation is performed in an oxidizing atmosphere without use of activating auxiliary;

(6) active carbon prepared from activated meso-carbon microbeads obtained from coal-type pitch and having pores, the active carbon being characterized in that
  (i) the carbon is optically anisotropic,
  (ii) 90% or more of the whole of carbon consists of particles 80 μm or less in particle size,
  (iii) the micropores of 20 Å or less in pore diameter constitute 85% or more of the entire pore volume, and
  (iv) the carbon has a specific surface area of 3000 to 4600 m$^2$/g.

Recently it has been found that spherulites having reticular layers of 6-membered carbon ring superposed in parallel over each other are formed in the pitch during heating of petroleum-type or coal-type pitch in preparation of needle coke or carbon fibers from the pitch. The spherulites form a phase different from the phase of matrix pitch and can be isolated by anti-solvent method, centrifugal separation method or the like. The separated spherulites, generally termed meso-carbon microbeads, are spherical bodies about 3 to about 60 μm in diameter and about 400 to about 4,500 m$^2$/g in specific surface area and have optically anisotropic structure. With such peculiar shape and properties, the mesocarbon microbeads are expected to find use as new materials for production of high-performance materials. Nevertheless the mesocarbon microbeads have been so far used merely as starting materials for manufacture of high-density carbon materials.

Our research revealed that if the meso-carbon microbeads obtained from coal-type pitch are activated, carbon materials such as active carbon having an utterly new shape and properties can be produced from the activated meso-carbon microbeads.

Described below in detail are an invention on a process for activating meso-carbon microbeads and on active carbon prepared from said meso-carbon microbeads.

In the invention, meso-carbon microbeads obtained from coal-type pitch are activated as they are or as provided on the surface thereof with an activating auxiliary. Examples of the activating auxiliary are KOH, NaOH and like hydroxides of alkali metals. At least one of them is used. A preferred amount of the activating auxiliary used is about 5 to about 10 times the weight of meso-carbon microbeads. Since the degree of activation is substantially in proportion to the amount of activating auxiliary used, the specific surface area of the active carbon can be varied by varying the amount thereof. An activating auxiliary such as KOH which is solid at room temperature is used preferably in the form of an aqueous solution. On the other hand, there is no special need for providing as an aqueous solution an activating auxiliary such as $H_3PO_4$ which is liquid at room temperature.

To improve the "wettability" of activating auxiliary on the surface of meso-carbon microbeads, acetone, methyl alcohol, ethyl alcohol or the like may be conjointly used as a surfactant. A preferred amount of the surfactant used is about 5 to about 10% based on the total amount of meso-carbon microbeads and an activating auxiliary or a solution containing an activating auxiliary.

Activation is done by heating meso-carbon microbeads with an activating auxiliary deposited thereon to a temperature of about 400° to about 1200° C. The rate of elevating the temperature and the heat-retaining time are not specifically limited. Usually on heating to said temperature, the microbeads are immediately cooled or held at the same temperature for about 3 hours or less. The activation is effected in any of inert atmospheres such as nitrogen or argon atmosphere, and oxidizing atmospheres containing water vapor, carbon monoxide, oxygen or the like. In case of inert atmosphere, a higher yield is achieved.

In activation in an inert atmosphere, it is more preferred to heat the meso-carbon microbeads with an activating auxiliary deposited thereon to about 400° to about 1200° C. while elevating the temperature at a rate of about 300° to about 600° C./hr and to maintain the same temperature for 30 minutes to about 1 hour.

In activation in an oxidizing atmosphere, an activating auxiliary is used. This activation is done more preferably by heating the microbeads to a temperature of about 400° to about 900° C. in the presence of activating auxiliary, at a temperature-elevating rate of about 300° to about 600° C./h, followed by maintaining the same temperature for about 2 to about 3 hours. Care should be taken to avoid bumping which may occur in use of activating auxiliary.

Our research shows that an optimum activating temperature exists for every activating auxiliary. For example, optimal activating temperatures are about 800° to about 1000° C. for KOH, and about 600° C. for NaOH. After activation, the meso-carbon microbeads are cooled to room temperature, washed with water to remove the unreacted activating auxiliary and the reaction product of activating auxiliary and dried to provide a carbon material according to the invention.

In the invention, the activating auxiliary is presumed to promote the oxidative gasification of the carbon in the meso-carbon microbeads. Stated more specifically, the activating auxiliary is reacted with the carbon atoms of reticular layers of 6-membered carbon ring constituting the meso-carbon microbeads to convert the carbon into carbon monoxide or carbon dioxide, and is discharged out of the system.

In activation in an inert atmosphere, the portion having not participated in the reaction becomes carbonized, developing a difference in the structure between the reacted and unreacted portions, thereby forming pores. In this way the meso-carbon microbeads are formed with the micropores substantially 20 Å in pore diameter as a whole and having a pore diameter distribution with a sharp peak in the vicinity of 13 to 14 Å. In an inert atmosphere, the gas reaction at the surface of micro-beads occurs with an increased selectivity, resulting in a prominent increase of yield.

The reaction of carbon and activating auxiliary in the invention proceeds at a high intensity. In consequence, if carbon fibers are activated in place of meso-carbon microbeads according to the invention, the activated carbon fibers are deformed to a shape entirely different from the original one and imparted a significantly reduced strength. On the other hand, the activated meso-carbon microbeads retain the original spherical shape and exhibit no marked reduction of strength.

The active carbon prepared according to the invention is optically anisotropic and include micropores 20 Å or less in diameter which constitute 85% or more of pore volume. The micropores of the active carbon is about 3000 to about 4600 $m^2/g$ in the specific surface area and about 0.5 to about 3.0 ml/g in the entire pore volume. The active carbon adsorbs benzene at an adsorptivity of about 0.2 to about 1.0 g/g according to JIS K 1474 and methylene blue at an adsorptivity of at least 600 ml/g according to JIS K 1470.

Given below are Examples to clarify the invention in greater detail with reference to the accompanying drawings of which:

Example 1

Figure 1:
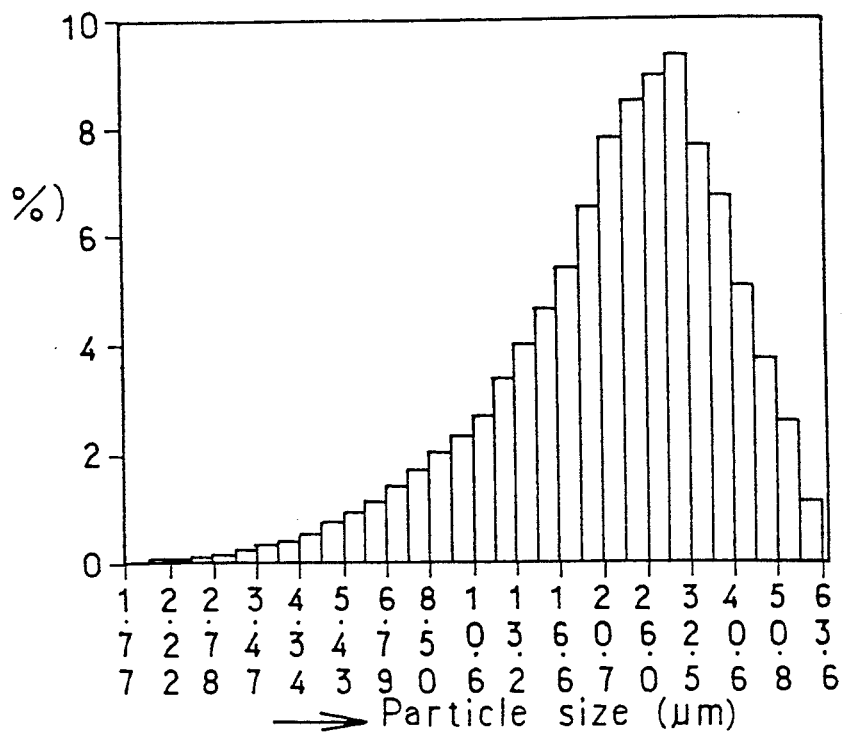
FIG. 1 and FIG. 2 are graphs each showing the particle size distribution of the mesocarbon microbeads used as a starting material in the Examples of the invention.
Figure 2:
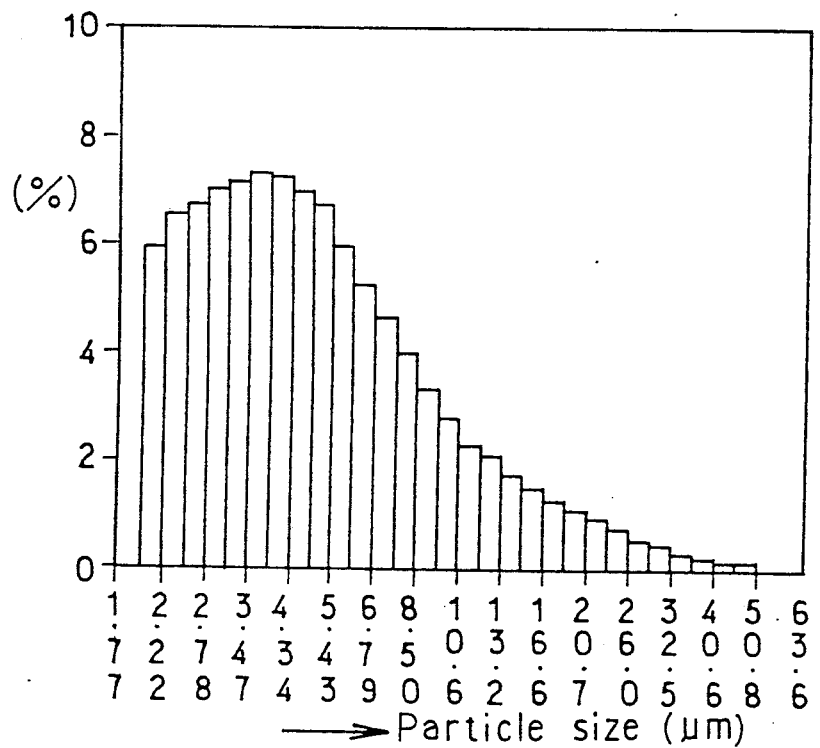

Water and acetone were added in specific amounts to a mixture of 10 g of mesocarbon microbeads obtained from coal-type pitch having a particle size distribution as shown in FIG. 1 (weight distribution) and FIG. 2 (distribution of the number of the microbeads) and a specific amount of potassium hydroxide (activating auxiliary). The mixture was stirred homogeneously, giving a slurry. The slurry was then heated in an atmosphere of nitrogen gas at a temperature of from room temperature to 850° C. while elevating the temperature at a rate of 10° C./min and was maintained at this temperature for 1 hour. The reaction product obtained was cooled to not more than 100° C., washed with water and dried.

Table 1 shows the weight ratio (KOH/M) of potassium hydroxide to mesocarbon microbeads (MCB), and the amount of the water and acetone used. Table 2 shows the properties of the obtained carbon materials Nos. 1 to 11.

Figure 3:
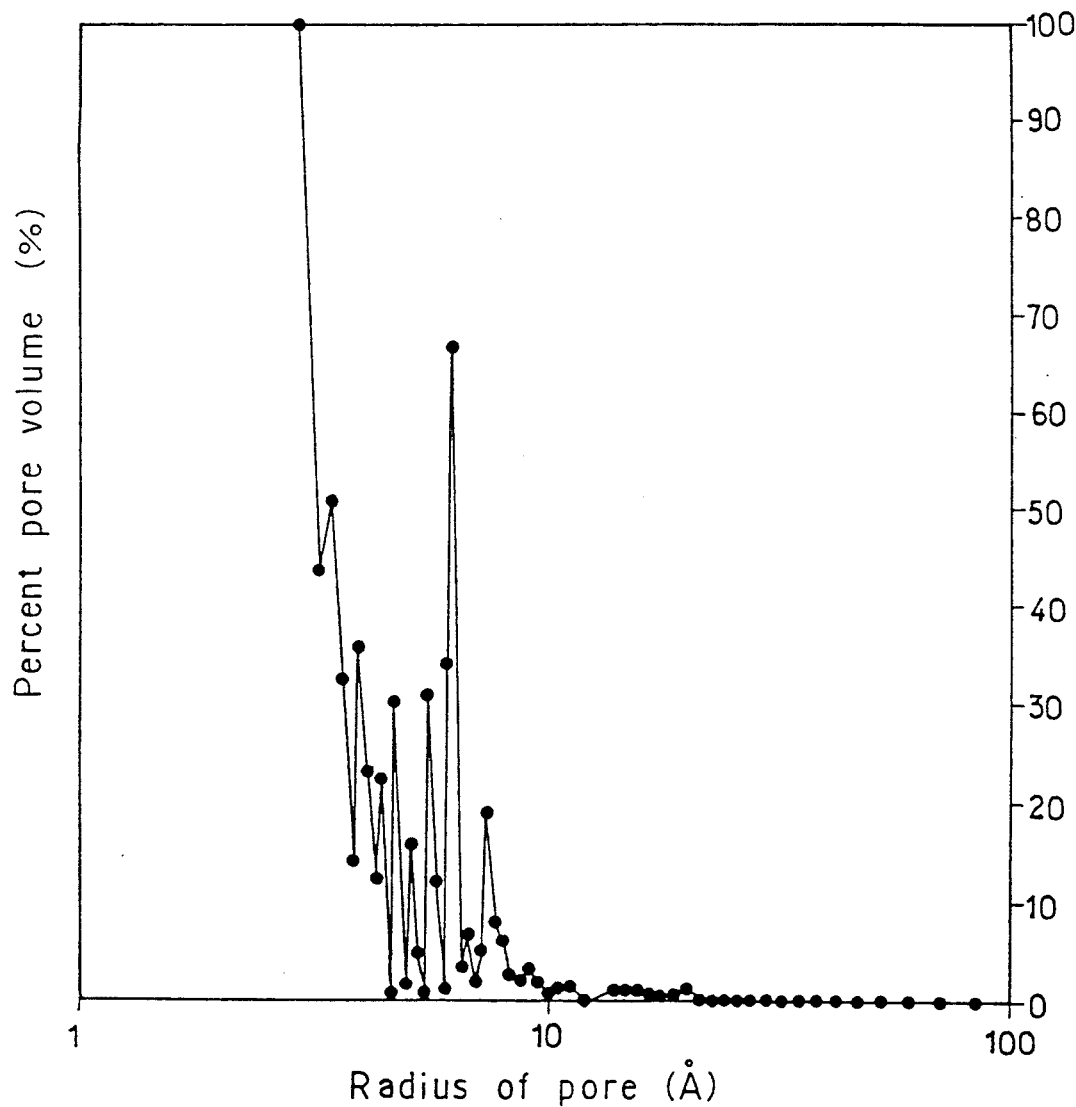
FIG. 3 is a graph showing an adsorption isotherm obtained by subjecting the activated carbons produced in the Examples to $N_2$ gas adsorption method.

FIG. 3 shows an adsoption isotherm determined by subjecting carbon material No. 9 to $N_2$ gas adsorption method (determined with Autosorb I, manufactured by Yuasa Ionics Kabushiki Kaisha). FIG. 3 clearly indicates that almost all the pores formed are micropores having a radius of up to 10Å.

The properties of the carbon materials as shown in Table 2 were determined as follows. First, the adsorption isotherm was determined by $N_2$ gas adsorption method (with Autosorb I, manufactured by Yuasa Ionics Kabushiki Kaisha) and then, on the basis of the adsorption isotherm, there were determined (I) BET specific surface area ($m^2/g$), (II) specific surface area of micropores ($m^2/g$), (III) specific surface area of mesopores ($m^2/g$), (IV) total volume of whole pores (ml/g) and (V) volume of the micropores (ml/g). In FIG. 2, the column (VI) shows the yields (wt. %).

TABLE 1

| No. | KOH/M | Water (ml) | Acetone (ml) |
|---|---|---|---|
| 1 | 0.1 | 5 | 1 |
| 2 | 0.3 | 10 | 2 |
| 3 | 0.5 | 10 | 2 |
| 4 | 0.7 | 15 | 3 |
| 5 | 1.0 | 20 | 5 |
| 6 | 1.5 | 30 | 5 |
| 7 | 2.0 | 40 | 10 |
| 8 | 3.0 | 60 | 15 |
| 9 | 5.0 | 100 | 20 |
| 10 | 7.0 | 140 | 30 |
| 11 | 10.0 | 200 | 40 |

TABLE 2

| No. | (I) | (II) | (III) | (IV) | (V) | (VI) |
|---|---|---|---|---|---|---|
| 1 | 106 | 96 | 10 | 0.0744 | 0.051 | — |
| 2 | 129 | 117 | 12 | 0.0884 | 0.061 | — |
| 3 | 542 | 530 | 11 | 0.3044 | 0.273 | 89 |
| 4 | 681 | 672 | 9 | 0.3700 | 0.344 | — |
| 5 | 1040 | 1034 | 6 | 0.5551 | 0.533 | 87 |
| 6 | 1025 | 1020 | 5 | 0.5459 | 0.520 | — |
| 7 | 1008 | 1002 | 6 | 0.5391 | 0.515 | — |
| 8 | 1715 | 1702 | 13 | 0.9051 | 0.869 | 78 |
| 9 | 3006 | 2916 | 90 | 1.7079 | 1.537 | 62 |
| 10 | 4150 | 4043 | 107 | 2.5599 | 2.300 | 47 |
| 11 | 4578 | 4433 | 145 | 2.8665 | 2.630 | 35 |

Tables 1 and 2 show that the properties of active carbon are gradually improved with the increase of the amounts of KOH used.

Figure 4:
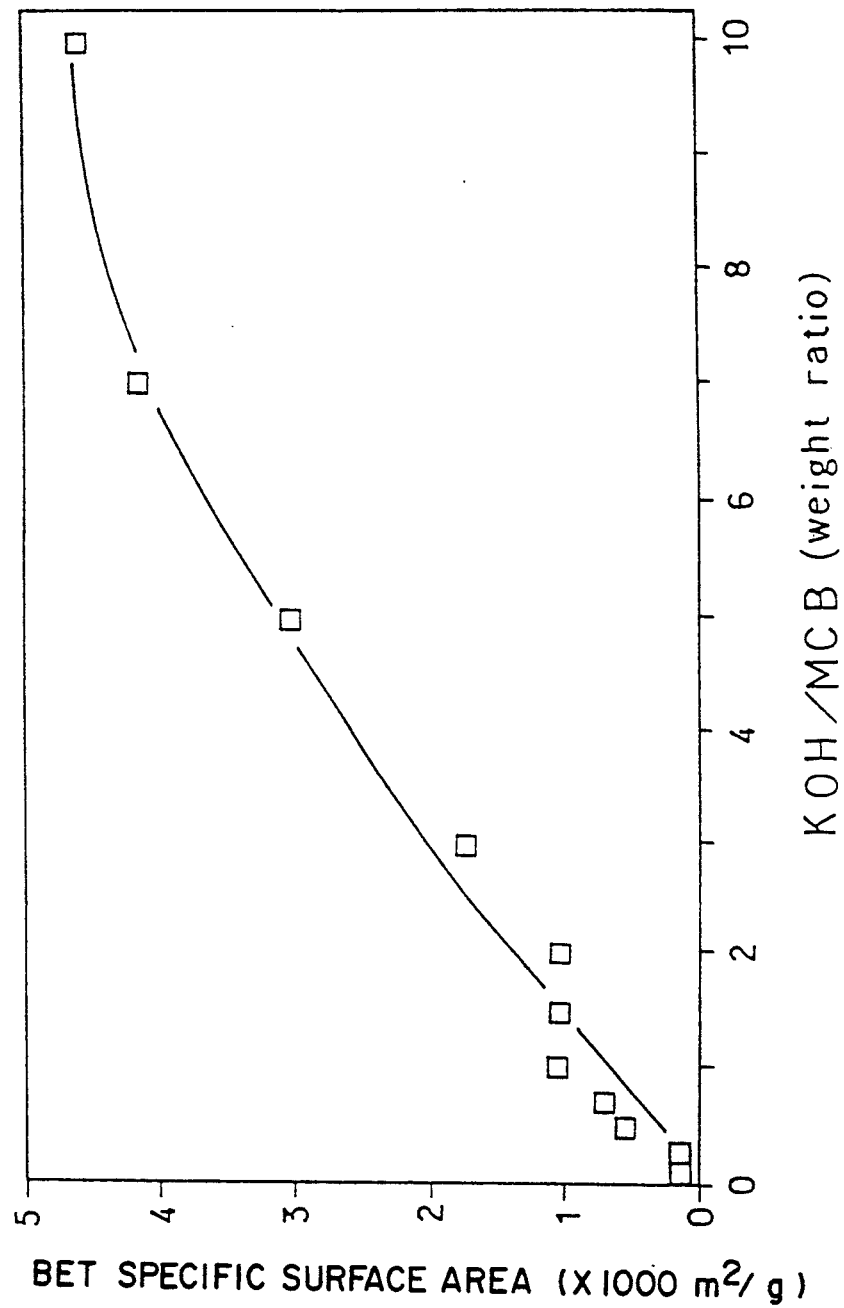
FIG. 4 is a graph indicating the relationship between the amount of the KOH used and the BET specific surface area in the Examples.

FIG. 4 is a graph showing the relationship between the amount of KOH used (weight ratio of KOH/M) and the BET specific surface area of the carbon material obtained in this example.

Although the yield is lowered as the amount of KOH used is increased (the carbon material No. 5 was obtained in an 87% yield, whereas the material No. 11 in 35%, the degree of activation can be desirably adjusted.

EXAMPLE 2

Carbon materials were each produced in the same manner as done for preparing the material No. 9 of Example 1 with the exception of effecting the activation at a temperature of 400° C., 600° C., 800° C., 1000° C. and 1200° C., respectively.

Table 3 shows the properties of the thus obtained carbon materials Nos. 12 to 16.
Table 3

TABLE 3

| No. | (I) | (II) | (III) | (IV) | (V) |
|---|---|---|---|---|---|
| 12 | 72 | 61 | 11 | 0.0522 | 0.031 |
| 13 | 1025 | 1020 | 5 | 0.5122 | 0.498 |
| 14 | 3010 | 3000 | 10 | 1.7112 | 1.514 |
| 15 | 3026 | 3010 | 16 | 1.7254 | 1.502 |
| 16 | 2150 | 2112 | 38 | 1.1244 | 0.914 |

As seen from Table 3, when KOH is used as an activating auxiliary, it is desirable to conduct the activation at a temperature of about 800° to about 1000° C.

EXAMPLE 3

Carbon materials were each produced in the same manner as done for preparing the material No. 10 of Example 1 with the exception of using NaOH in place of KOH and effecting the activation at a temperature of 400° C., 600° C. and 800° C., respectively.

Table 4 shows the properties of the thus obtained carbon materials Nos. 17 to 19.

TABLE 4

| No. | (I) | (II) | (III) | (IV) | (V) |
|---|---|---|---|---|---|
| 17 | 2120 | 2104 | 16 | 0.9872 | 0.844 |
| 18 | 3440 | 3391 | 9 | 1.9122 | 1.724 |
| 19 | 2900 | 2874 | 26 | 1.6241 | 1.502 |

Comparison Example 1

Carbon materials were each prepared in the same manner as done for producing the material No. 5 of Example 1 with the exception of using CsOH in lieu of KOH and carrying out the activation at a temperature of 400° C., 600° C. and 800° C., respectively.

Table 5 shows the properties of the thus obtained carbon materials Nos. 20 to 22.

TABLE 5

| No. | (I) | (II) | (III) | (IV) | (V) |
|---|---|---|---|---|---|
| 20 | 56 | 48 | 9 | 0.0506 | 0.028 |
| 21 | 808 | 800 | 8 | 0.4449 | 0.412 |
| 22 | 305 | 299 | 6 | 0.1770 | 0.156 |

Comparison Example 2

Carbon materials were each produced in the same manner as done for preparing the material No. 5 of Example 1 with the exception of using $K_2SO_4$ in place of KOH and performing the activation at a temperature of 400° C., 600° C. and 800° C., respectively.

Table 6 shows the properties of the obtained carbon materials Nos. 23 to 25.

TABLE 6

| No. | (I) | (II) | (III) | (IV) | (V) |
|---|---|---|---|---|---|
| 23 | 3 | 1 | 1 | 0.0036 | 0.001 |
| 24 | 4 | 2 | 1 | 0.0043 | 0.002 |
| 25 | 243 | 230 | 12 | 0.1482 | 0.127 |

Comparison Example 3

Carbon materials were each prepared in the same manner as done for preparing the material No. 5 of Example 1 with the exception of using $K_2S$ in lieu of KOH and conducting the activation at a temperature of 400° C., 600° C. and 800° C., respectively.

Table 7 shows the properties of the thus produced carbon materials Nos. 26 to 28.

TABLE 7

| No. | (I) | (II) | (III) | (IV) | (V) |
|---|---|---|---|---|---|
| 26 | 42 | 37 | 5 | 0.0341 | 0.020 |
| 27 | 461 | 447 | 13 | 0.2631 | 0.242 |
| 28 | 677 | 656 | 21 | 0.3839 | 0.351 |

Comparison Example 4

Carbon materials were each prepared in the same manner as done for producing the material No. 5 of Example 1 with the exception of using $H_3PO_4$ in place of KOH and effecting the activation at a temperature of 400° C., 600° C. and 800° C., respectively.

Table 8 shows the properties of the thus produced carbon materials Nos. 29 to 31.

TABLE 8

| No. | (I) | (II) | (III) | (IV) | (V) |
| --- | --- | --- | --- | --- | --- |
| 29 | 147 | 136 | 11 | 0.1090 | 0.072 |
| 30 | 88 | 79 | 9 | 0.0687 | 0.042 |
| 31 | 49 | 43 | 6 | 0.0399 | 0.023 |

Comparison Example 5

The same mesocarbon microbeads as used in Example 1 were heated in an atmosphere of $H_2O$-saturated $N_2$ gas at a temperature of from room temperature to 800° C. while elevating the temperature at a rate of 10° C./min and were maintained at this temperature for 180 minutes, giving a carbon material.

Table 9 shows the properties of the thus obtained carbon material No. 32.

The yield of the obtained carbon material was 30% and the BET specific surface area was as small as 640 $m^2/g$.

TABLE 9

| No. | (I) | (II) | (III) | (IV) | (V) |
| --- | --- | --- | --- | --- | --- |
| 32 | 640 | 599 | 41 | 0.3698 | 0.317 |

Comparison Example 6

Carbon materials were each prepared in the same manner as done for producing the material No. 5 of Example 1 with the exception of using $ZnCl_2$ in place of KOH and carrying out the activation at a temperature of 400° C., 600° C. and 800° C., respectively.

Table 10 shows the properties of the thus produced carbon materials Nos. 33 to 35.

TABLE 10

| No. | (I) | (II) | (III) | (IV) | (V) |
| --- | --- | --- | --- | --- | --- |
| 33 | 379 | 367 | 12 | 0.2181 | 0.197 |
| 34 | 333 | 326 | 7 | 0.1838 | 0.171 |
| 35 | 145 | 139 | 6 | 0.0860 | 0.075 |

EXAMPLE 4

The carbon materials No. 9 and No. 11 obtained in Example 1 were tested for occlusion with methane under a pressure of 9 kg/cm² G.

Table 11 shows the test results together with a result obtained with use of a known granular activated carbon.

As seen from the results shown in Table 11, it is clear that the carbon material of the present invention has a great adsorptivity even under an elevated pressure and is therefore usable as an agent for gas occlusion as charged into a gas bomb.

TABLE 11

|  | Specific area ($m^2/g$) | Amount of occluded methane (N $m^3/g$) |
| --- | --- | --- |
| Particulate activated carbon | 1250 | 53.8 |
| Carbon material No. 9 | 3006 | 69.2 |
| Carbon material No. 11 | 4578 | 87.7 |

I claim:

1. A process for preparing active carbon having a specific surface area of 3000 to 4600 $m^2/g$, the process comprising:
   depositing an activating auxiliary on the surface of meso-carbon microbeads obtained from coal-derived pitch, the activating auxiliary being at least one of NaOH and KOH and used in an amount about 5 to about 10 times the weight of meso-carbon microbeads, and
   activating washing and drying the meso-carbon microbeads.

2. A process according to claim 1 wherein a surfactant selected from the group consisting of acetone, methyl alcohol and ethyl alcohol is used in depositing the activating auxiliary on the surface of meso-carbon microbeads.

3. Active carbon prepared by the process of claim 1 from activated meso-carbon microbeads obtained from coal-derived pitch and having pores, the active carbon being characterized in that
   (i) the carbon is optically anisotropic
   (ii) 90% or more of the whole of carbon consists of particles 80 μm or less in particle size,
   (iii) the micropore of 20 Å or less in pore diameter constitute 85% or more of the entire pore volume, and
   (iv) the carbon has a specific surface area of 3000 to 4600 $m^2/g$.

* * * * *

UNITED STATES PATENT AND TRADEMARK OFFICE
CERTIFICATE OF CORRECTION

PATENT NO. : 5,143,889
DATED : September 1, 1992
INVENTOR(S) : KASUH et al

It is certified that error appears in the above—identified patent and that said Letters Patent is hereby corrected as shown below:

On the cover page, under "United States Patent", item [19] change "Takahiro et al" to --Kasuh et al--.

Item [75], change "Kasuh Takahiro, Kobe; Morino Gunji, Izumi" to --Takahiro Kasuh, Kobe; Gunji Morino, Izumi--.

Signed and Sealed this

Seventh Day of September, 1993

*Attest:*

BRUCE LEHMAN

*Attesting Officer*     *Commissioner of Patents and Trademarks*